United States Patent [19]

Christensen et al.

[11] Patent Number: 4,926,659
[45] Date of Patent: May 22, 1990

[54] DOUBLE EFFECT AIR CONDITIONING SYSTEM

[75] Inventors: Richard N. Christensen; Anthony C. DeVuono; William H. Wilkinson; D. Karl Landstrom, all of Columbus, Ohio

[73] Assignee: Gas Research Institute, Chicago, Ill.

[21] Appl. No.: 331,675

[22] Filed: Mar. 30, 1989

[51] Int. Cl.⁵ .............................................. F25B 15/00
[52] U.S. Cl. ........................................ 62/476; 62/495
[58] Field of Search ................................... 62/476, 495

[56] References Cited

U.S. PATENT DOCUMENTS

| | | | |
|---|---|---|---|
| 1,960,821 | 5/1934 | Maiuri et al. | 62/495 X |
| 3,423,951 | 1/1969 | Elsberg | 62/476 X |
| 3,509,732 | 5/1970 | Roeder, Jr. | 62/476 |
| 3,750,421 | 8/1973 | Merrick | 62/476 |
| 4,291,545 | 9/1981 | Worsham | 62/476 X |
| 4,424,688 | 1/1984 | Wilkinson | 62/476 |
| 4,573,330 | 3/1986 | Van der Sluys et al. | 62/495 X |
| 4,748,830 | 6/1988 | Ooucht et al. | 62/476 |
| 4,791,790 | 12/1988 | Tongu | 62/476 |

Primary Examiner—Lloyd L. King
Attorney, Agent, or Firm—Robert B. Watkins

[57] ABSTRACT

A absorption refrigeration system having cooling and heating modes of operation functions with a double-effect or "split" refrigeration cycle having approximately the same refrigerant concentration span in each cycle loop. The system includes a novel direct expansion combined evaporator and absorber assembly with improved heat transfer characteristics and with interchangeable liquid flows accomplished through actuation of a conventional reversing valve. Also, the system is provided with improved recuperative heat exchangers to further increase system energy conversion efficiencies.

25 Claims, 7 Drawing Sheets

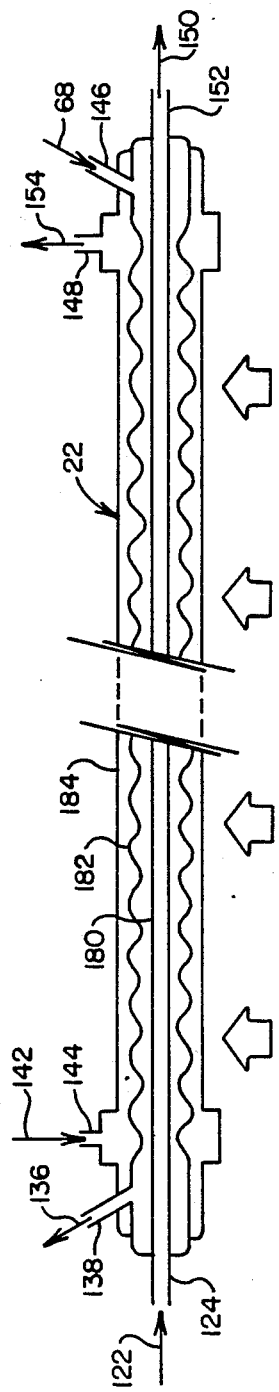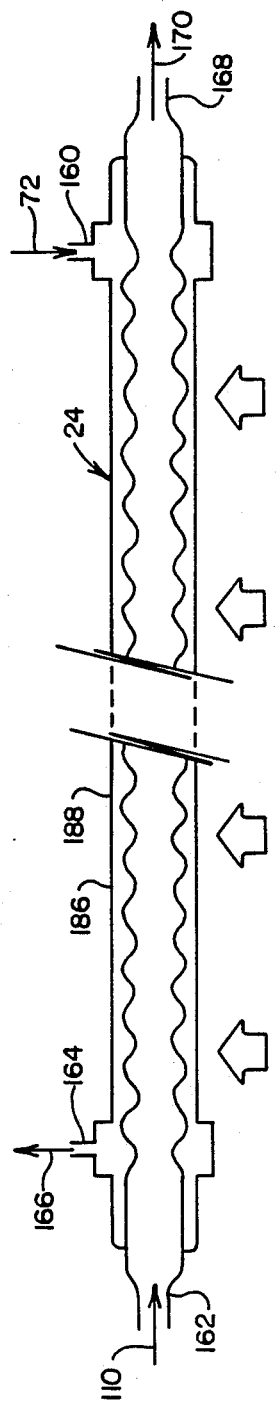

DOUBLE EFFECT AIR CONDITIONING SYSTEM

FIELD OF THE INVENTION

This invention relates generally to air conditioning, and particularly concerns apparatus and methods for alternately cooling or heating air using a double effect absorption refrigeration cycle. The system of this invention is particularly useful in residential air conditioning applications.

BACKGROUND OF THE INVENTION

Residential air conditioning systems utilizing the absorption refrigeration cycle to alternately accomplish either cooling or heating are generally well known. One example of such a system is the gas-fired, Arkla-Sun Valley absorption machine employing a lithium bromide/water refrigerant solution in a single effect absorption refrigeration cycle with a direct expansion evaporator and atmospheric rejection of absorber heat through a separate hydronic loop. Also, utilization of a double effect absorption refrigeration cycle in applications requiring alternate air cooling and heating is well known as taught by U.S. Pat. No. 4,441,332 issued in the name of William H. Wilkinson.

However, such known air conditioning system as applied to typical residential cooling and heating applications have not achieved optimum energy conversion efficiencies, have proven costly to implement and operate, and have operational drawbacks such as tendency toward salt crystallization and reduced ability to recover from salt re-crystallization in the case of a sustained power outage.

We have discovered that the prior art shortcomings can be overcome by practice of our invention wherein an improved double effect absorption refrigeration cycle is utilized in an air conditioning system implementation that is particularly advantageous for residential air cooling and heating applications.

SUMMARY OF THE INVENTION

The present air conditioning system basically utilizes an improved gas-fired, double effect absorption refrigeration cycle wherein a conventional lithium bromide/water refrigeration solution total flow is "split" to accomplish system solution processing in two different loops and pressure ranges, and partially within a reversible evaporator/absorber assembly. Such significantly avoids the potential for salt re-crystallization such as in the case of a severe electrical power outage. The "split" processing involves parallel cycles with approximately the same refrigeration solution concentration span. Since the system utilizes a single evaporator in the dual effect scheme, there is no need for the complication of dual evaporator and absorber elements used in some advanced multiple effect absorption systems.

The present air conditioning system also utilizes a number of novel system locations for recuperative heat transfer functions which when taken with other features of the invention significantly improve the energy conversion efficiency (coefficient of performance) of the total system in both cooling and heating modes of operation. Such coefficient of performance is also further improved in part by a novel reversible evaporator/absorber assembly that efficiently develops tube member vertical wall surface wetting with liquid refrigerant or concentrated refrigerant solution using a meniscus-forming interior helical coil to thereby increase the absorption of refrigerant vapor into the concentrated refrigerant solution (heating) or evaporation of refrigerant vapor from liquid refrigerant (cooling). This novel arrangement allows the air flow to be cooled directly by the evaporating refrigerant liquid or be heated directly through the same air side tube member finned surfaces by the absorption of refrigerant vapor into the concentrated refrigerant solution.

Also, in the improved air conditioning system configuration of this invention the system heating capacity is readily and significantly augmented by utilization of an included supplemental heat source to expeditiously provide system heat which substantially exceeds that provided by the system burner for air cooling purposes.

The foregoing and other advantages of the invention will become apparent from the following disclosure in which a preferred embodiment of the invention is described in detail and illustrated in the accompanying drawings. It is contemplated that variations and structural features and arrangement of parts may appear to the person skilled in the art, without departing from the scope or sacrificing any of the advantages of the invention which is delineated in the included claims.

DESCRIPTION OF THE DRAWINGS

FIG. 6 is a sectional illustration of the low pressure solution heat exchanger module of the FIG. 1 through FIG. 3 air conditioning system;

FIG. 7 is a sectional illustration of the high pressure solution heat exchanger module of the FIG. 1 through FIG. 3 air conditioning system;

DETAILED DESCRIPTION

Figure 1:
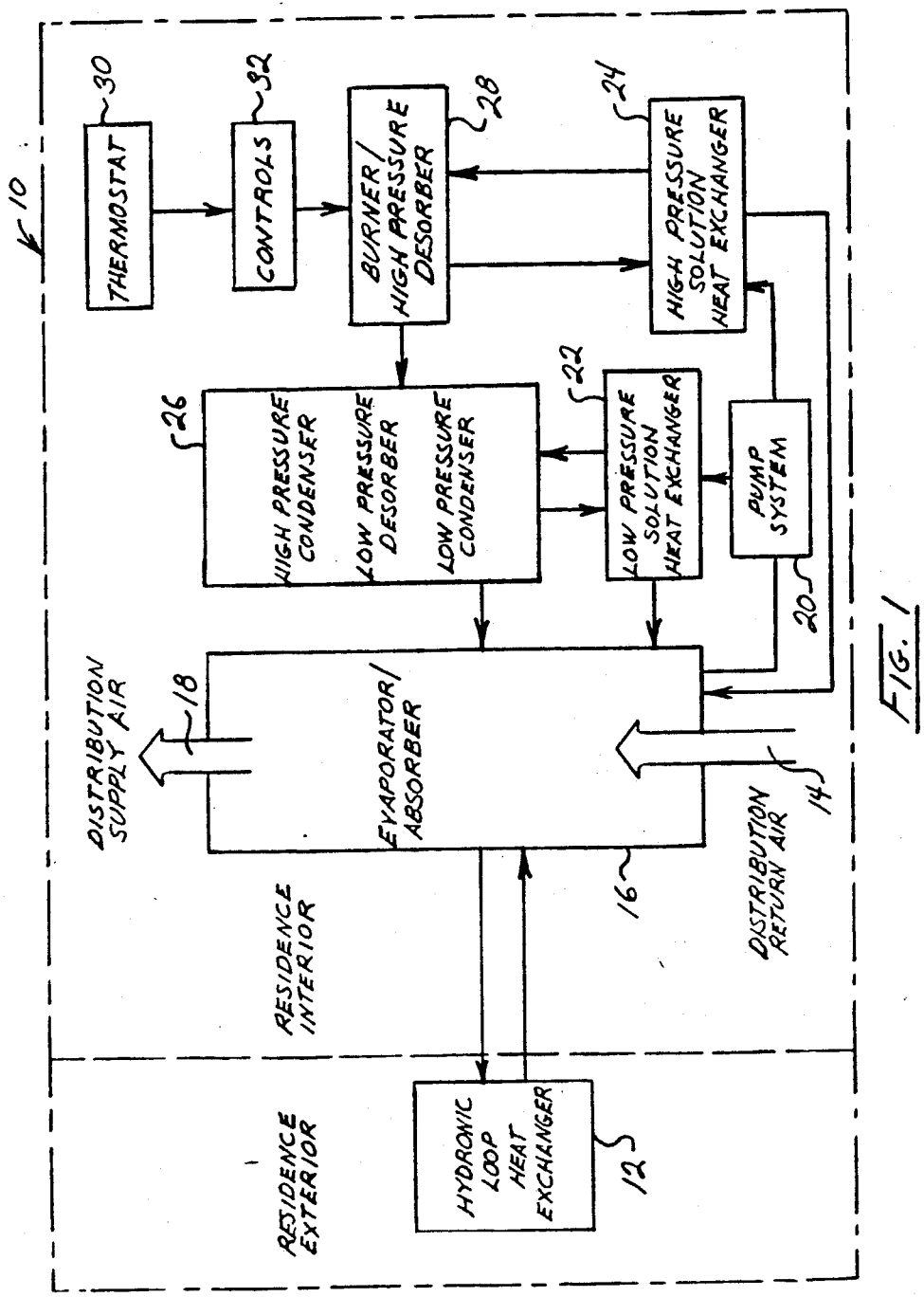
FIG. 1 is a block diagram illustrating the principal modules or sub-systems comprising the dual effect air conditioning system of this invention.

FIG. 1 is a block diagram of a preferred embodiment of the double effect air conditioning system of this invention. Such system is referenced generally as 10 and typically installed, except for its exterior (atmospheric) hydronic loop heat exchanger 12, within a residence or building interior. Interior cooling and heating is accomplished by flowing distribution return air 14 through a functionally reversible evaporator/absorber module 16 to become further cooled or heated distribution supply air 18. System 10 is further principally comprised of a two-stage pump system 20 which flows refrigerant solution from evaporator/absorber module 16 to a low pressure solution heat exchanger module 22 and to a high pressure solution heat exchanger 24. Low pressure solution heat exchanger 22 further cooperates with a solution control module 26 comprising a low pressure condenser assembly (34), a low pressure desorber assembly (36), and a high pressure condenser assembly (38). High pressure solution heat exchanger 24 cooperates with a burner/desorber module 28 comprising a gas-fired burner assembly (40) and a high pressure desorber assembly (42). Module 28 further cooperates with solution control module 26 and it in turn further cooperates with evaporator/absorber module 16. System 10 is also provided with a conventional multi-mode thermostat 30 to generate command signals, and with control module 32 to regulate pump system module 20 and various hereinafter described valves in response to commands from thermostatic control 30.

Figure 2:
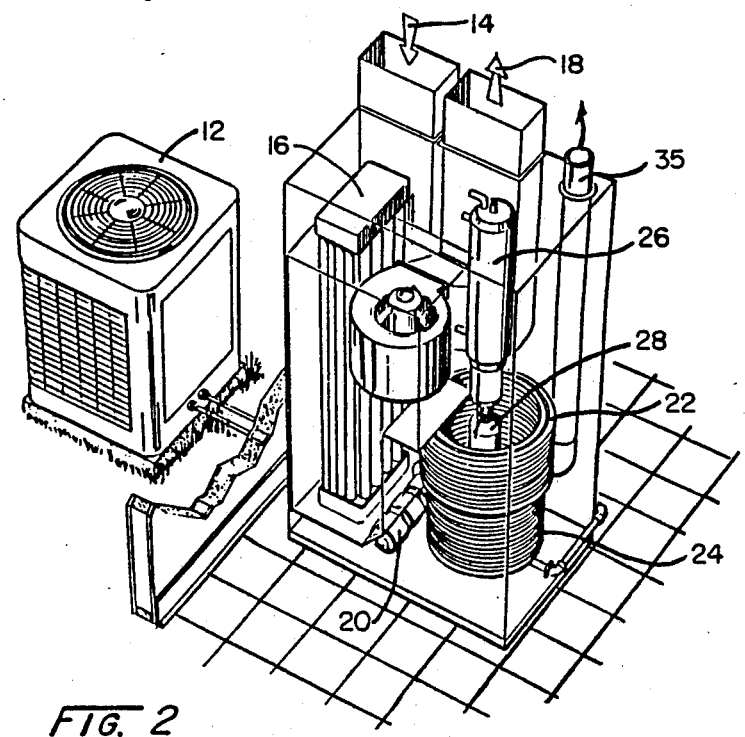
FIG. 2 is a perspective view of the system of FIG. 1 in one packaging configuration but without included control components being illustrated.

FIG. 2 illustrates one packaging configuration for the included modules of the air conditioning system of FIG. 1. Additionally, FIG. 2 illustrates a flue assembly 35 which is provided to conduct combustion products produced by gas-fired burner/desorber module 28, after appropriate baffling in heat transfer relation to heat exchangers 22 and 24, to the building or residence exterior.

Figure 3:
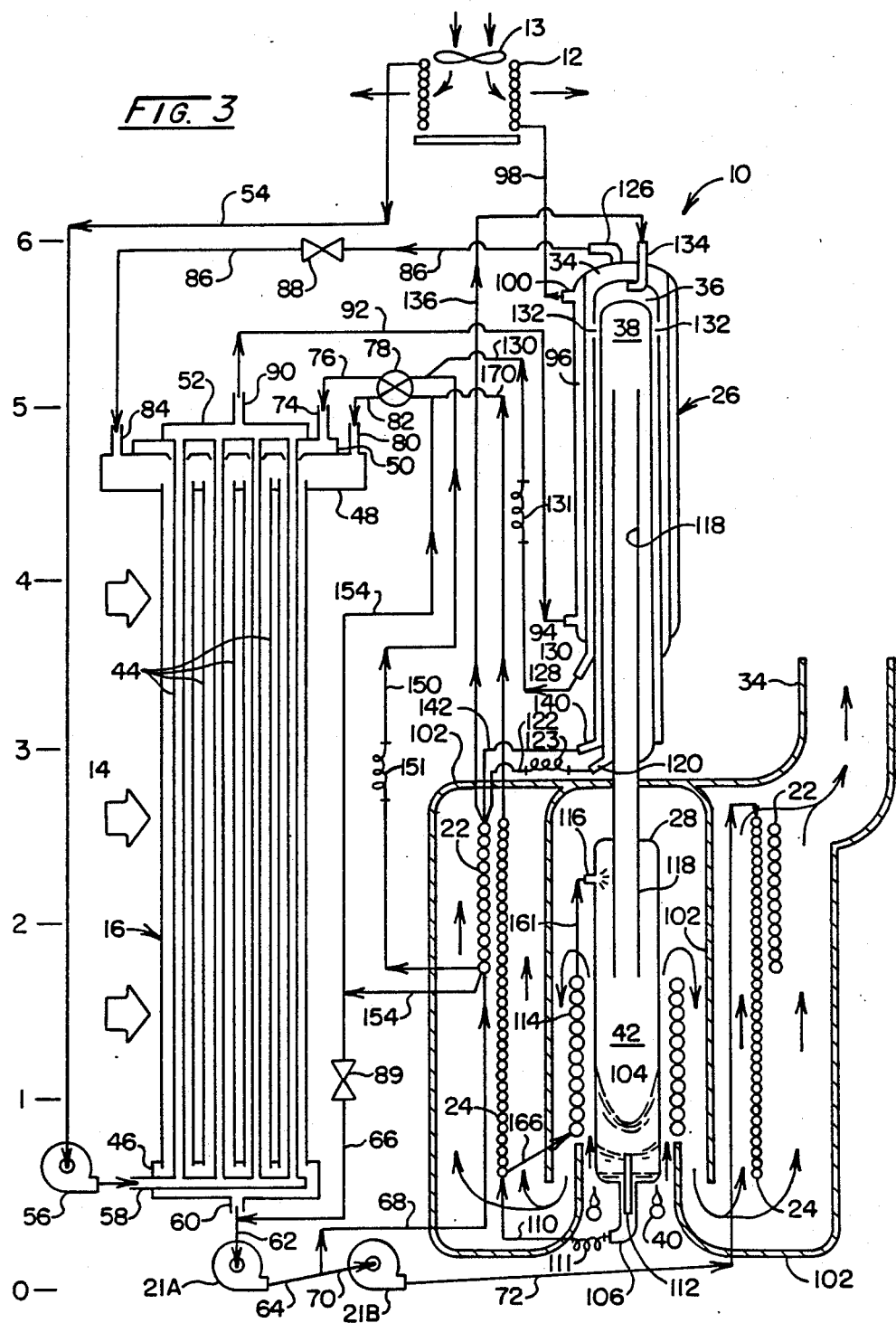
FIG. 3 is a schematic elevational illustration, partially in section, of the air conditioning system of FIGS. 1 and 2.

FIG. 3 schematically illustrates air conditioning system 10 in elevation and includes a marginal scale, in feet, to indicate an approximate vertical construction scaling of the system modules in one system packaging configuration. Central to system 10 is evaporator/absorber module 16 which is comprised of a number of spaced-apart vertical "tube-in-tube" tube assemblies 44 which are connected at their opposed ends to headers 46, 48, 50 and 52. Distribution return air 14 is flowed horizontally between tube assemblies 44 for cooling or heating into distribution supply air 18. Lower header 46 receives hydronic fluid (e.g., an ethylene glycol and water solution) from hydronic loop heat exchanger 12 through line 54, circulating pump 56, and header inlet 58. Lower header 46 also receives low pressure dilute refrigeration solution (weak absorbent) by gravitational flow from tube assemblies 44 and such refrigeration solution is collected and flowed through header outlet 60 and line 62 to pump system 20 comprised of charging pump 21A and booster pump 21B. Booster pump 21B is connected to pump 21A through line 64. The dilute refrigerant solution (weak absorbent) flow from lower header 46, including any by-pass solution received through line 66, is "split" after pressurization by pump 21A in a manner whereby one portion is fed through line 68 to low pressure solution heat exchanger assembly 22 and the other portion is fed through line 70 to booster pump 21B for further pressurization and flow to high pressure solution heat exchanger assembly 24 through line 72. Directions of hydronic fluid flow, refrigerant vapor flow, refrigerant liquid flow, and refrigeration solution flow are indicated throughout the drawings by appropriate arrows superimposed on the various lines.

Headers 48 and 50 of assembly 16 receive various concentration refrigeration solution, refrigerant liquid, or refrigerant vapor flows from solution control module 26 depending on the operating mode (cooling or heating) selected for system 10. In the cooling mode, concentrated refrigerant solution is received in header 50 through inlet 74 and line 76 which is also connected to 4-way reversing valve 78. In the same system mode, liquid refrigerant is received in header assembly 48 through inlet 80 and from line 82 also connected to reversing valve 78. Changing system 10 mode of operation from cooling to heating and vice versa is basically accomplished primarily by actuating reversing valve 78 to interchange its output flows in lines 76 and 82 and by actuating by-pass valve 89 and vapor value 88. Header assembly 48 receives refrigerant vapor through inlet 84 and line 86 from low pressure condenser assembly 34 in the system heating mode of operation. Refrigerant vapor flow through line 84 is controlled by opening valve 88 in the system heating mode only. Valve 88 is sized to maintain the desired elevated pressure in low pressure desorber chamber 36.

Header 52 of evaporator/absorber assembly 16 receives hydronic fluid flowed vertically upwardly through tube assemblies 44 and such fluid is flowed out of outlet 90 and through line 92 to the inlet 94 of the annular outer cooling jacket (heat exchanger) 96, of solution conditioner module 26. After flow through cooling jacket (heat exchanger) 96 such fluid is flowed through outlet 100 and line 98 for return to hydronic loop heat exchanger 12 and line 54.

The "splitting" of dilute refrigerant solution flow from line 64 to lines 68 and 70 is essentially controlled by the selection of the pumping characteristics of pumps 21A and 21B. In the alternative, a separately controlled flow proportioning valve might be installed at the junction of lines 64, 68, and 70. In either case, the total dilute refrigerant solution flow is split so that the flows through the consequent separate parallel desorption/absorption loops each have substantially the same refrigerant vapor concentration span. See FIG. 5 and its pertinent discussion.

Another key module of air conditioning system 10 is the gas burner/high pressure desorber module designated 28. Gas burner assembly 40 is of conventional construction and operation. Its combustion products, however, are flowed in heat exchange relationship to desorber assembly 42 and to low and high pressure solution heat exchangers 22 and 24 by appropriate baffling 102. Baffling 102 accomplishes the combustion product flow indicated by arrows and directs such flow to building flue 34 and not in heat transfer relationship to solution conditioner module 26. Burner assembly 40 also may be configured to have a bi-level heat output as later discussed in connection with system capacity augmentation methods.

High pressure desorber assembly 42 is essentially a cylindrical chamber with a bottom portion that holds a pool of concentrated refrigerant solution 104 and that has an outlet 106 which is connected by line 110 to the inlet 162 (FIG. 7) of high pressure solution heat exchanger 24. Line 110 includes a flow restrictor such as capillary tube length 111 for system passive flow control purposes. Other forms of fixed value flow restrictor such as a line orifice might be substituted for capillary 111. A suitable vortex breaker 112 is installed in the bottom of desorber chamber 42 and partially in outlet 106 to prevent the formation of a vapor passageway from the upper region of assembly 42 to outlet 106. Desorber assembly 42 also includes a pre-heater coil 114 that is located in the path of burner combustion product flow. The preferred solution path in pre-heater 114 is an upward spiral to maximize the path length with a simple configuration. The combustion products are ducted up the inside face of heat exchanger 114 in the annular space between it an cylindrical desorber module 28 and afterwards flowed downwardly over the outerface of heat exchanger 114. Heat exchanger 144 may be a cylindrical expanded plate coil or, as illustrated, a closely stacked coil of tubing.

Preheated concentrated refrigerant solution is introduced into inlet 116 of desorber assembly 42 from the outlet of preheater coil 114. Preferably, inlet 116 is oriented to direct preheated refrigerant solution from coil 114 into the interior chamber approximately tangentially to the interior cylindrical surface of desorber chamber 42. Such establishes a vortex or centrifugal motion which helps separate heavier liquid portions from evolved vapor.

The bulk of refrigerant vapor generation is accomplished by heat exchange of heat from burner element 40 through the vertical and bottom walls of desorber chamber 42. An open-ended tubular baffle 118 is included in desorber chamber 42 (and further in high pressure condenser chamber 38) to assist in achieving solution vapor-liquid separation. Essentially dry refrigerant vapor passes directly from within the lower portion of baffle 118 to the connected, above-located, interior chamber of high pressure condenser 38 of solution conditioning module 26. Refrigerant vapor is condensed on the inner cylindrical surface of high pressure condenser chamber 38 and drains to and collects as a liquid condensate at the annular chamber cup portion having outlet 120. Line 122 connects outlet 120 to inlet 124. (FIG. 6) of low pressure solution heat exchanger 22. Also, line 122 incorporates a flow restriction in the from of capillary 123 for flow control purposes as hereinafter explained.

Solution conditioner module 26 has a surrounding annular heat exchanger jacket 96 that flows and circulates hydronic fluid received from evaporator/absorber module 16. Immediately within annular jacket chamber 96 is a separate annular low pressure condenser assembly chamber 34 having an upper outlet 126 that connects to line 86 and a lower outlet 128 that is connected by line 130 to reversing valve 78. Line 130 also includes a capillary line insert 131 for flow control purposes. Low pressure condenser chamber 34 receives refrigerant vapor from concentric, interiorly-located, annular low pressure desorber chamber 36 through the upper connecting orifice passageways or openings designated 132 for condensing. Annular desorber chamber 36 has an upper inlet 134 that connects to line 136 to receive preheated dilute refrigerant solution from outlet 138 (FIG. 6) of low pressure solution heat exchanger 22. Chamber 36 also has a lower outlet 140 connected to line 142 and also through line 142 to low pressure solution heat exchanger assembly 22 but at inlet 144 (FIG. 6) for the further flow of conditioned concentrated refrigerant solution. Solution flows downwardly over the length of the outside surface of chamber 38 and provides the cooling necessary to condense refrigerant vapor in chamber 38 and release vapor for flow through orifice openings 132 into chamber 34.

Low pressure solution heat exchanger assembly 22 is further connected at inlet 146 to line 68 to receive dilute solution from pump 21A, at outlet 148 (FIG. 6) to line 150 to flow temperature-conditioned concentrated refrigerant solution to reversing valve 78 in the system cooling mode, and at outlet 152 (FIG. 6) to line 154 to flow condensed refrigerant vapor to reversing valve 78. Like lines 110, 120, and 130, line 150 also incorporates a flow restriction in the form of capillary line insert 151 for system control purposes as hereinafter discussed. Condensate (liquid refrigerant) from high pressure condenser chamber 38 is flowed through tube 180 so that the subcooling energy can be recovered in the process of heating dilute refrigerant solution fed through tube 182 from low pressure desorber assembly 36.

High pressure solution heat exchanger 24 is connected at inlet 160 (FIG. 7) to line 72 to receive high pressure dilute refrigerant solution (weak absorbent) from booster pump 21B and at inlet 162 (FIG. 7) to line 110 to receive concentrated refrigerant solution from the bottom of desorber chamber 42. Outlet 164 (FIG. 7) connects to line 166 and in turn to the inlet of desorber module preheater coil 114. The outlet of coil 114 is connected by line 167 to inlet 116 of desorber chamber 42. Outlet 168 of high pressure solution heat exchanger 24 connects to line 170 to flow concentrated refrigerant solution to reversing valve 78.

Valve 88 is actuated in conjunction with the actuation of reversing valve 78 for interchanging the cooling and heating modes of system operation. Basically valve 88 is closed in the cooling mode of system operation. Valve 88 is opened when switching to the system heating mode. By-pass valve 89 is only opened during starting to allow a gravity return of solution from the low pressure desorber discharge outlet 140 until the start-up transient has built up sufficient pressure that solution can be returned to the headers at the top of evaporator/absorber module 16.

Figure 4:
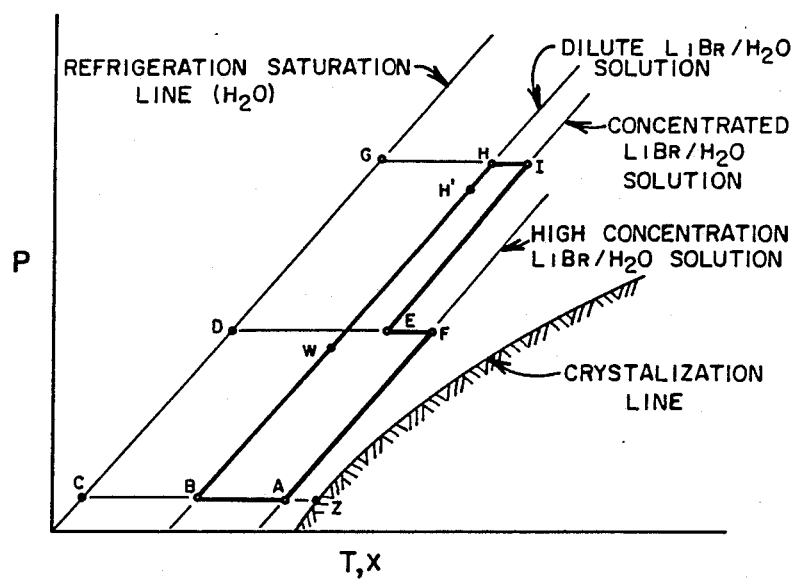
FIG. 4 is a P/T,x diagram for a representative conventional double effect absorption refrigeration cycle.

FIG. 4 provides a diagram for a conventional double effect absorption refrigeration cycle wherein refrigerant solution vapor pressure (P) is plotted as the ordinate and vapor temperature (T) and decreasing vapor concentration (X) are plotted as abscissas. This Figure is to be compared with the diagram of FIG. 5 for the double effect absorption refrigeration cycle utilized in air conditioning system 10. Referring to FIG. 4, points A and B bound the absorption process in a conventional double-effect cycle in which concentrated solution at the concentration defined by point A is diluted to its equilibrium exit condition, point B, by refrigerant vaporized at conditions represented by point C. The suppressed temperature of the evaporation, point C, accomplishes the cooling while the temperatures of the absorption process, A-B, are sufficient to reject heat to the ambient. Dilute solution at B is pumped to a pressure sufficiently higher than the pressure at H to allow flow through the two-step recuperative heat exchange path between B and H. The dilute solution heated to approach point H is fed to the high desorber where it is partially diluted to condition I by the external heat input that drives the system. This partially diluted solution is cooled from I to E as the concentrated solution fed to the high desorber is heated from W to H'. The equilibrium point H is used for convenient reference and that temperature is not usually attained by the recuperative preheat (heat exchange).

The pure vapor released from the desorption process, H-I, is condensed at temperature G which is higher than the temperature E-F so that this condensation energy can further concentrate the solution in the low desorption process between points E and F. The vapor released during the low desorption (E-F) is condensed at temperature D. The low condenser D rejects heat to the ambient whereas the high condenser G, rejects heat to the low desorber, E-F. The additional concentration of solution in the low desorber is driven by heat released within the cycle (high condensation at G) and is referred to as the "second effect". The fully concentrated solution at F is cooled from F to A (approximately) as it heats the dilute solution from B to W.

In the parallel solution flow used in this cycle, the evaporation at L is equivalent to that at C reevaporating the refrigerant condensed at M (like D) and at Q (like G). The solution loops, however, are quite different, acting like two single-effect loops arranged cooperatively to create a double effect cycle. At K the dilute solution leaves the absorber and is pumped to a pressure high enough to overcome the heat exchange, K to N,, prior to entering the low desorber, process N-P, where the solution is concentrated and the evolved vapor condensed at M. The concentrated solution at P is cooled form P to J providing the heat for the previously discussed heating of dilute solution from K to N'. The absorption process from J to K completes a single effect cycle.

Dilute solution leaves the absorber at U for the high pressure cycle and, after pressurization, is recuperatively heated to about point R' before entering the high desorber where the equilibrium temperature is at R. The process from R to S has been described relative to chamber 42, preheat coil 114 with heat supplied by burner 40, and solution at condition S leaving at 106. The high pressure solution heat exchanger 24, cools concentrated solution from S to T as the dilute solution is preheated from K to R'. The solution flow leaving the high pressure heat exchanger 24, point T, is merged with the solution flow from the low pressure heat exchanger 24, point J, and the combined solution flow enters the evaporator absorber 16. Point K is exactly point U but points J and T are only approximately identical.

One feature of this invention using this cycle is the narrower change in concentration between U and T across the evaporator/absorber 16 instead of the larger concentration change from B to A in the more conventional double-effect cycle without a loss in absorption capacity. This allows a larger working margin to the crystallization limit indicated by point Z on both FIG. 4 and FIG. 5.

An additional feature of this cycle is the recover of the subcooling energy from Q to M in the low pressure heat exchanger. A further advantage of this system is the recovery of heat from the exhaust gases flowing over heat exchanger 22 and 24. These two effects improve cycle efficiency by bringing point N, closer to point N as a result of the multiple heat exchanges in low pressure solution heat exchanger 22. Similarly, adding exhaust heat to the high solution heat exchanger 24 brings point R' closer to R, thus increasing cycle efficiency by reducing the amount of heat required by each desorption process.

Previously discussed heat exchanger modules 22 and 24 in system 10 are each of helical coil configuration and surround gas burner/high pressure desorber module 26 in the path of burner combustion product flow. Further details of heat exchanger 22 and 24 are developed in FIGS. 6 and 7, respectively.

Low pressure solution heat exchanger module 22 (FIG. 6) is essentially constructed as a tube within a tube within a tube. Innermost metal tube 180 is connected at its opposed ends to lines 122 and 154 to cool refrigerant to evaporator/absorber 16 through valve 78. Tube 180 is concentrically positioned within extended surface metal tube 182 that is connected at its opposed ends to lines 68 and 136 to heat dilute refrigerant solution flowed from low pressure pump 21A (point K on FIG. 6) to the upper interior of low pressure desorber chamber 36 (point N, on FIG. 5). Tube 182 in turn is concentrically positioned within metal tube 184 that is connected at its opposed ends to lines 142 and 150 to cool concentrated refrigerant solution flowed from exit 140 (point P) of low pressure desorber chamber 36 to evaporator/absorber 16.

Figure 5:
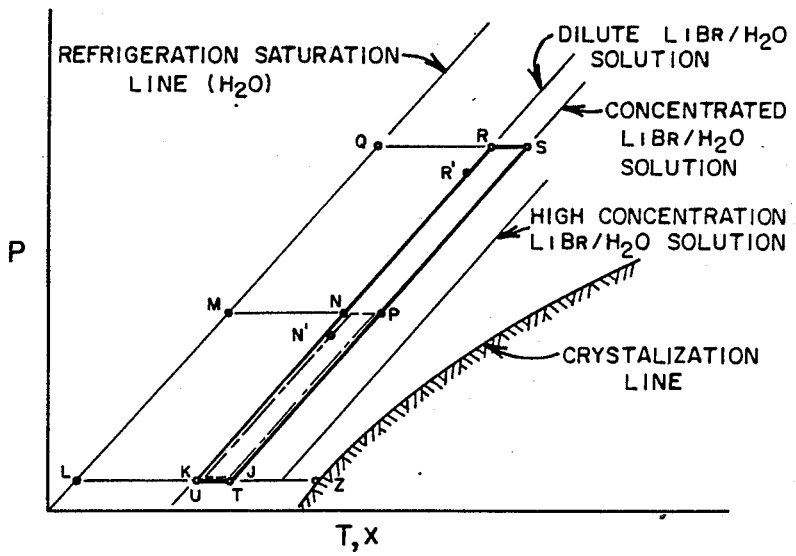
FIG. 5 is a P/T,x diagram similar to FIG. 4 but for the double effect absorption refrigeration system of this invention.

High pressure solution heat exchanger assembly 24 (FIG. 7) is essentially constructed as a tube within a tube. Innermost metal tube 186 has an extended surface configuration and is connected at its opposed ends to lines 110 and 170 (at points S and T of FIG. 5, respectively) to flow diluted refrigerant solution after cooling from the lowermost region of high pressure desorber chamber 42 to either header 48 or 50 of evaporator/absorber 16 depending on the system mode of operation. Tube 186 is concentrically positioned within metal tube 188 that is connected at its opposed ends to lines 76 and 166 to heat dilute refrigerant solution flowed from booster pump 21B to enter preheater coil 114 in high pressure desorber module 28 at point R' (FIG. 5).

Figure 8:
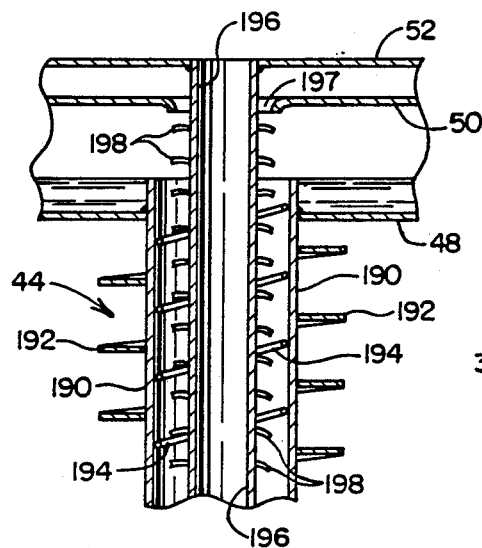
FIG. 8 is a sectional illustration of a preferred compact embodiment of a composite evaporator/absorber tube assembly incorporated in the evaporator/absorber module illustrated in FIG. 3.
Figure 13:
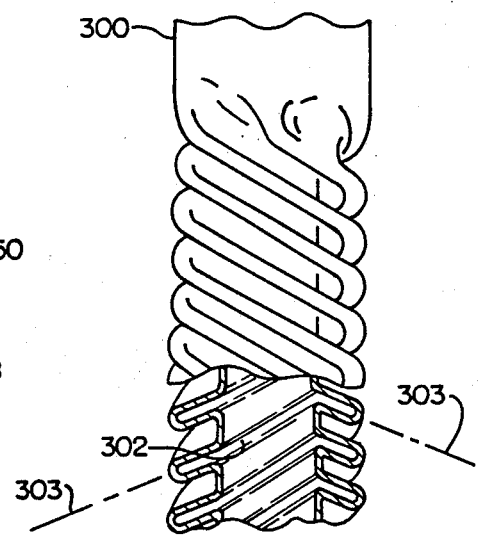
FIG. 13 is a cross-sectional view of another form of evaporator/absorber tube for the air conditioning system of FIG. 3.

FIG. 8 illustrates a detailed section taken through one construction of an evaporator/absorber tube assembly 44 (FIG. 3). Each vertical assembly is comprised of an exterior metal tube 190 with a metal helical fin 192 or other surface heat transfer augmentation joined to its exterior surface. A helical coiled distribution spring 194 is inserted within tube 190 and continuously contacts the interior surface of tube 190 along a helical line. Concentrically positioned within tube 190 and spring 94 is innermost metal tube 196 having conventional integral exterior spines 198. Tube 196 functions to flow hydronic fluid coolant through evaporator/absorber assembly 16. Condensed refrigerant liquid is flowed (cooling mode) vertically downward by gravitational forces cover the interior heat transfer surface of tube 190 in the distribution air airstream. Vaporized refrigerant then flows radially across the vertical annular passageway between tubes 190 and 196 absorbed by concentrated solution wetting the expanded solution surface created by spines 198. (Concentrated refrigerant solution is flowed over the exterior surface of tube 196 from the annular gap 197 formed between the exterior of tube 196 and a downturned outlet opening edge in the bottom of header 50). A minimum radial clearance (e.g., ⅛ inch) between the immediately opposed surfaces of tubes 190 and spines 198 which define the annular passageway is required to prevent cross-over of liquid flow from one process to the other. A less costly alternate construction for tube assembly 44 might include either or both a conventional vertical fluted and spiralled tube 300 (FIG. 13) in lieu of tube 190/fin 192 and a like twisted fluted tube in lieu of tube 196/spines 198. It should be noted for FIG. 13 that the internal tube of flute 302 preferably slopes downwardly and outwardly in cross-section, as indicated by axes 303, so as to enhance heat transfer surface wetting in both the cooling mode and the heating mode of system operation. In the heating mode the concentrated solution is flowed over the interior of tube member 190 (300) and the absorption heat is transferred into the airstream by air contact with the exterior heat transfer surface of tube member 190 (300) including any external fins 192 or their equivalent. Vapor in the heating mode is supplied through header inlet 84, as discussed earlier and must travel axially through the annular space between tubes 190 and 196. Without heating augmentation the condensed refrigerant flows down the exterior heat transfer surface of tube member 196 without significant change and is mixed with the dilute refrigeration solution in header (sump) 46. For augmented heating (See FIG. 11 and discussion of FIG. 12), the liquid refrigerant is vaporized by heated hydronic fluid flowed interiorly of tube 196 and the so-produced vapor flows radially across the annular gap for absorption in solution on the inner heat transfer surface tube 190. Thus releasing additional heat for transfer by tube 190 into the surrounding airstream.

Figure 9:
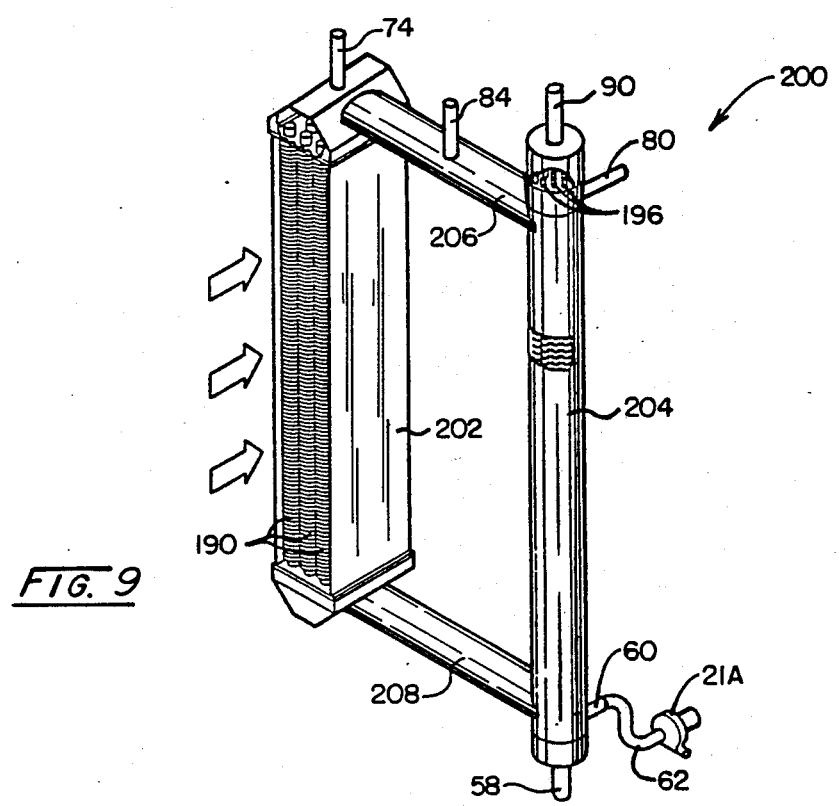
FIG. 9 is another configuration of a reversible evaporator/absorber module for the air conditioning system of FIG. 3.

An alternate configuration for evaporator/absorber module 16 is schematically illustrated in FIG. 9 and is referenced generally as 200. Module 200 is comprised of a separate evaporator assembly 202 joined to a separate absorber assembly 204 by upper and lower refrigerant vapor header assemblies 206 and 208. Inlets 58, 74 and 80 and outlets 60 and 90 correspond to the similarly referenced inlets and outlets in the FIG. 3 system schematic illustration. Module 200 appears less costly to manufacture than the module 16 of FIGS. 3 and 8.

In the FIG. 9 evaporator/absorber configuration, spaced-apart finned tubes 190 are oriented vertically in assembly 202. Distribution air passes over the exterior finned heat transfer surfaces of such tubes. Liquid refrigerant is flowed through inlet 74 in the system cooling mode and is introduced into the interiors of tubes 190 by appropriate dripper feed devices 210 (not shown) for evaporation by the transfer of heat from the distribution air. The produced refrigerant vapor is circulated to absorber assembly 204 through close-coupling connecting headers 206, 208 which are preferably short in length (e.g. 4-5 inches) though not illustrated as such. Concentrated refrigerant solution introduced through inlet 80 in the system cooling mode is flowed from an appropriate header (not shown) over the exterior heat transfer surfaces of included assembly tube members 196 and is cooled in assembly 204 by hydronic fluid flowed through included tube members 196. The diluted refrigerant solution that results from vapor absorption into the concentrated solution is collected in the header below the lower absorber assembly tube sheet (not shown) and flowed to pump 21A through outlet 60 and line 62. Outlet 60 is positioned at a level slightly below the vapor passageway of header 208 and above the header or lower tube sheet for tubes 196.

In the heating mode of system operation, and through appropriate valve switching as previously detailed, assembly 204 functions as the system evaporator and assembly 202 as the system absorber. In this mode of operation, refrigerant vapor is introduced through inlet 84 (and also from headers 206 and 208) for absorption into concentrated solution input at inlet 74 thereby transferring heat to the airstream flowed over vertical tubes 190.

Figure 10:
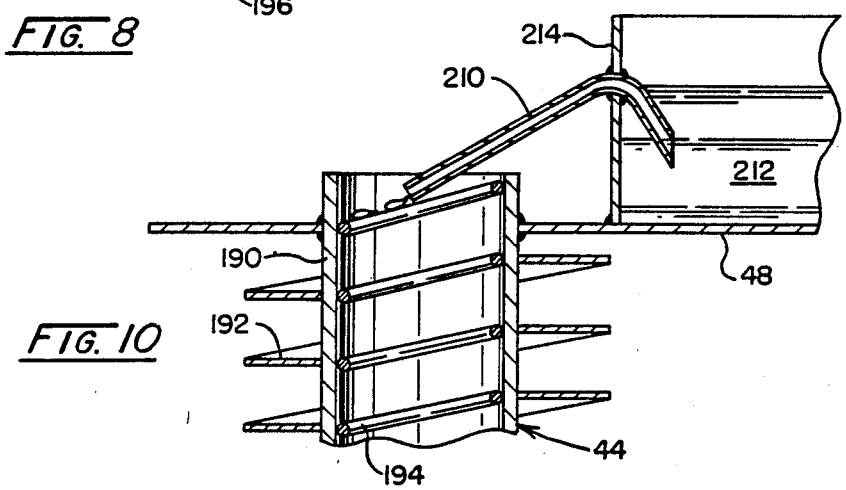
FIG. 10 is a schematic elevational view of a preferred embodiment of a refrigeration liquid solution flow control element for feeding liquid refrigerant or concentrated refrigerant solution to an absorption refrigeration system evaporator/absorber module.

FIG. 10 schematically illustrates an improved flow control element 210 for advantageously feeding refrigerant liquid or concentrated refrigerant solution 212 from header 48 into an adjacent evaporator tube 190 at and generally tangent to the tube vertical interior surface. In the FIG. 10 schematic, tube 190 further includes the fluid distribution spring 194 previously illustrated in FIG. 8. (The concentrically positioned inner hydronic fluid tube 196 of FIG. 8 is omitted from FIG. 10 for purposes of clarity).

In one embodiment generally U-shaped and inverted flow control element 210 was formed of a 3/16" O.D. tube having an 0.053" wall thickness. It should be noted that as positioned and installed in header tray wall 214, which forms and contains a body of refrigerant liquid or concentrated refrigerant solution in the evaporator/absorber header assembly 48, dripper tube 210 did not act as a true siphon tube or capillary. However, once a small solution flow through tube 210 to tube member 190 commenced due to a combined pumping and dripping action during system operation, that flow continued through surface tension and meniscus effects even though the level of the upper surface of fluid body 212 dropped slightly below the level of the tube opening in header assembly 48. Because dripper tube 210 has a larger interior diameter than is typically associated with known absorption refrigeration dripper flow and capillary control devices, tube 210 is not prone to blockage by foreign matter inadvertently contained in the liquid refrigerant or refrigerant solution.

Figure 10A:
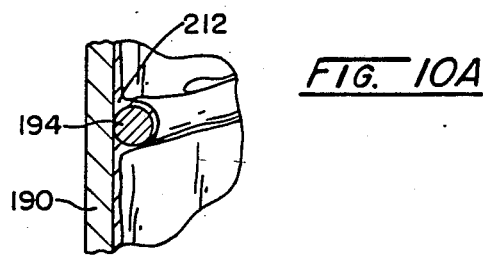
FIG. 10A is an enlarged portion of FIG. 10.

FIG. 10A is an enlarged portion of FIG. 10 illustrating the surface "washing" effect that is achieved by the inclusion of flow distribution element 194 (helical spring) in evaporator tube 190. As shown in this Figure, liquid flowed into tube 190 by dripper element 210 forms a meniscus above and below the contact line of element 194 with the interior surface of tube 190. Such menisci significantly aid the flow of distributed liquid over the tube interior surface as a "wash" to achieve improved heat transfer with the tube exterior and mass transfer to the annular vapor space.

Figure 11:
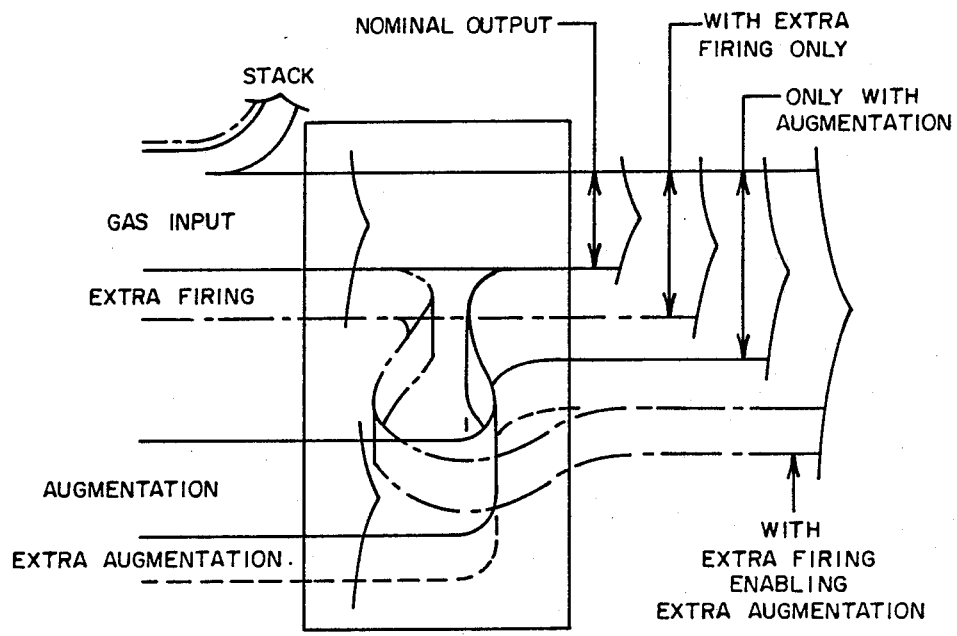
FIG. 11 is a schematic energy flow diagram for another air conditioning system having the features of this invention and also having an augmented heating capacity.
Figure 12:
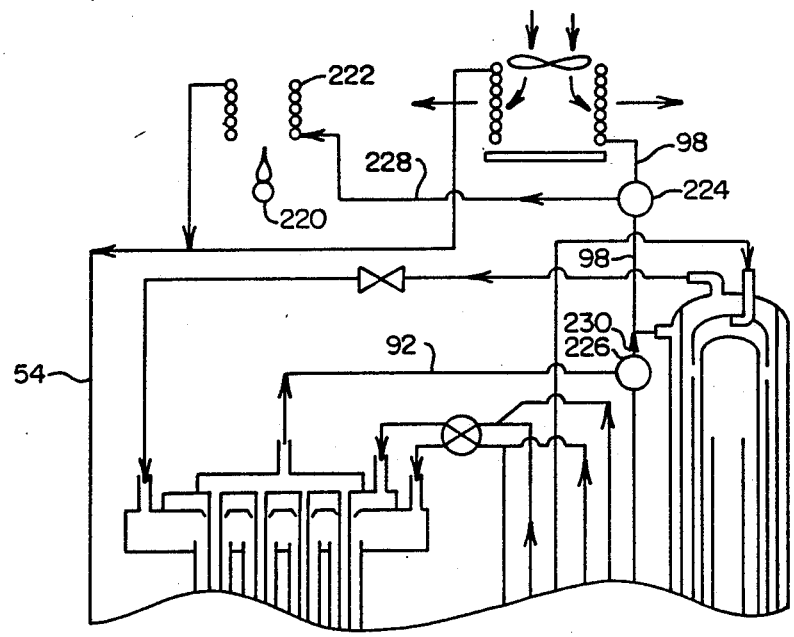
FIG. 12 is a schematic elevational illustration of a portion of the air conditioning system of FIG. 3 but with optional added components for providing the FIG. 3 system with a readily implemented augmented heating capacity.

FIG. 11 illustrates an energy flow diagram which is helpful in understanding methods and modifications that may be implemented to significantly increase the operating capacity of air conditioning system 10 in its heating mode of operation. FIG. 12 schematically illustrates one such modification.

As previously suggested, gas burner assembly 40 may be optionally provided with a selectively operable bi-level heat output capacity. The base firing level is selected to accomplish system cooling mode objectives using the system arrangement of FIG. 3 in its cooling mode of operation. The additional burner capacity level above the base level is the "Extra Firing" segment of the illustrated FIG. 11 energy flow.

More importantly, system 10 of FIG. 3 may also be modified as specified by FIG. 12 to include the "Augmentation" energy flow capability of FIG. 11. Such may be accomplished by providing an additional burner assembly 220 that cooperates with hydronic fluid heating coil 222, two 3-way by-pass valves 224 and 226, and interconnecting lines 228 and 230 in the manner shown. When valves 224 and 226 are actuated in the enhanced heating mode, hydronic fluid otherwise circulated to jacket heat exchanger 96 is diverted to flow to coil 222 in by-pass relation to hydronic fluid heat exchanger 12 thereby significantly increasing the temperature of the hydronic fluid flowed to evaporator/absorber module 16.

Several comments are in order with respect to the configuration of solution control module 26 and the control of various refrigerant vapor, refrigerant liquid, and refrigerant solution flows to, within, and from that module. Basically the baffle tube 118 which connects module 28 to module 26 is concentrically positioned within the heat transfer shell (wall) which defines high pressure condenser 38. Refrigerant vapor evolved in high pressure desorber module 28 and flowed through baffle tube 118 is condensed on the outer surface of condenser 38 (by the cooling effect of dilute solution in low pressure desorber chamber 36) and collected as a condensate in the lower condenser annular cup portion having condensate outlet 120. High pressure condenser 38 typically may see a vapor pressure in the pressure range of from approximately 30 psia to approximately 60 psia.

Low pressure desorber 36 concentrically surrounds high pressure condenser 38 and receives dilute refrigerant solution through inlet 134 to be flowed over the outer surface of the wall of condenser 38 by gravity and heated by transfer of heat from vapor in high pressure condenser 38 through that wall. Vapor driven off from the dilute solution passes through orifices 132 into low pressure condenser 34; the remaining concentrated refrigeration solution collects in the annular lower cup portion of desorber 36 to be flowed through outlet 140 to line 142. After further cooling in low pressure solution heat exchanger 22 the concentrated refrigeration solution is flowed into line 150, through flow restrictor 151, and thence to reversing valve 78.

The flow resistance of the path between inlet 142 and exit 154 of low-pressure heat exchanger 22 is the major restriction to the flow of concentrated refrigerant solution from low-pressure desorber outlet 140 to reversing valve 78 and the headers 48, 50 thus maximizing the use of the available flow potential in the heat exchange process.

Low pressure condenser 34 concentrically surrounds low pressure desorber 36 and receives vapor from chamber 36 through the orifices 132. Such vapor condenses on the condenser cylindrical surface that also partially defines cooling jacket 96 and flows by gravity to the lower annular condenser cup portion having outlet 128 for collection. Through the influence of flow restrictor 131 in condensate line 130, and also through the interaction of the condenser heat transfer surface (wall) and the free surface in the collection cup, as the vapor condensing pressure drops the free surface of the condensate pool rises and blocks off the lower portion of the condenser heat transfer surface from access to vapor to be condensed. This action reduces the surface area available for heat transfer and, therefore, requires that a large mean temperature differential be established. Some vapor remains uncondensed, raising the condenser pressure until equilibrium is established. This pressure effect is much stronger than the elevation effect so as long as the free surface of the condensate pool is in the annular collection cup, large changes in ambient conditions cause only moderate changes in the system upper operating pressure.

When excessive pressure in low pressure condenser 34 drives the free surface of the collected condensate (liquid refrigerant) downward out of the annular collection cup, the point within capillary device 131 at which the liquid reaches saturation conditions and begins to flash vapor bubbles also moves downward. The presence of bubbles within or at the flow restriction device (tube insert 131) increases the local velocity and radically changes the flow resistance of the tube. These two vertical effects also create an increased responsiveness to variations in ambient conditions so that the actual pressure swings in the total system are relatively small.

Similarly, and with respect to the placement of the condensate collection cup (with outlet 120) of high pressure condenser 38 and the provision of capillary tube 123 in line 122, improved system control is developed in connection flows of liquid refrigerant and condenser pressures associated with high pressure condenser 38. Further, the capillary flow element 155 installed in line 154 provides a similar control function for the concentrated refrigeration solution flow from, and pressures in, low pressure desorber chamber 36.

In effecting these modes of fluid flow control, the surface level of condensate in high pressure condenser chamber 38 is always maintained at a greater elevation than the condensate surface level in low pressure desorber chamber 36.

Lastly, because the pressure levels at which high pressure desorber 42 operates are relatively high (e.g., 30–60 psia), changes in the level of dilute solution pool 104 are relatively ineffective in balancing the exit flow in line 110 to the input flow through lines 72, 166, and 161. Capillary tube insert 111 in line 110 is defined diameter-wise so that the velocity head for the desired flow just matches the desired elevation head for the surface of pool 104 above the opening to outlet 106. When the pressure in desorber 42 increases and attempts to blow solution from the pool, the resulting loss in elevation head causes vapor flashing in tube resistance 111 so that a mixed flow of vapor and liquid enters high pressure solution heat exchanger 24. Once triggered, the vapor content will be maintained because of the increased flow resistance and the upward coil path, despite the change in temperature which lowers the saturation pressures for the refrigerant solution flowing into heat exchanger 24. This arrangement will virtually restrict the discharge flow through line 110 so that a reasonable inventory of solution will available in desorber 42 for all operating conditions.

Whereas high pressure desorber 42 and high pressure condenser 38 typically have upper operating pressures in the range of 30 to 60 psia, the typical operating pressures in the low pressure components of system 10 are in the range 2.5 to 4 psia. Evaporator/absorber absorption module 16 typically functions at an operating pressure to as low as 0.1 to 0.2 psia.

It is herein understood that although the present invention has been specifically disclosed with the preferred embodiments and examples, modifications and variation of the concepts herein disclosed may be resorted to by those skilled in the art. Such modifications and variations are considered to be within the scope of the invention and the appended claims.

We claim:

1. In an absorption refrigeration system for conditioning air within a building interior and having an air cooling mode of operation and an air heating mode of operation, in combination:

a. first substantially vertical tube members each having an outer air heat transfer surface and an inner liquid refrigerant/concentrated refrigerant solution heat transfer surface;

b. second substantially vertical tube members cooperating with said first tube members and each having an inner hydronic fluid heat transfer surface and an outer liquid refrigerant/concentrated refrigerant solution heat transfer surface;

c. air distribution means flowing building air substantially horizontally between and around said first tube member outer air heat transfer surfaces in both the system air cooling mode of operation and air heating mode of operation;

d. hydronic fluid loop means cooling and flowing hydronic fluid through said second tube members in heat transfer relation to said second tube member inner surface in the system air cooling mode of operation and heating and flowing hydronic fluid through said second tube members in heat transfer relation to said second tube member inner surfaces in the system air heating mode of operation; and e. absorption refrigeration fluid distribution means separately and simultaneously flowing liquid refrigerant and concentrated refrigerant solution to said first tube member inner heat transfer surfaces and to said second tube member outer heat transfer surfaces in the system air cooling mode of operation and in the system air heating mode of operation, said absorption refrigeration fluid distribution means flowing liquid refrigerant to said first tube member inner heat transfer surfaces and flowing concentrated refrigerant solution to said second tube member outer heat transfer surfaces for vertical gravitational flow in the system air cooling mode of operation, and flowing liquid refrigerant to said second tube member outer heat transfer surfaces and flowing concentrated refrigerant solution to said first tube member inner heat transfer surfaces for vertical gravitational flow in the system air heating mode of operation.

2. The air conditioning system defined by claim 1 and further comprised of second tube member outer heat transfer surfaces concentrically positioned interiorly of said first tube member inner heat transfer surfaces, said outer and inner heat transfer surfaces forming a substantially vertical annular passageway and being spaced apart from each other a minimum distance which precludes liquid refrigerant and concentrated refrigerant solution cross-flow.

3. The air conditioning system defined by claim 1 and further comprised of helical fluid distribution means within each said first tube member, said helical fluid distribution means being in contact with said first tube member inner heat transfer surfaces and forming liquid menisci on said first tube member inner heat transfer surfaces when receiving absorption refrigeration fluid from said absorption refrigeration fluid distribution means.

4. The air conditioning system defined by claim 1 and further comprised of helical fluid distribution means formed integral with said first tube member inner heat transfer surfaces, said integral helical fluid distribution means comprising helical flutes receiving and gravitationally flowing absorption refrigeration fluid from said absorption refrigeration fluid distribution means.

5. The air conditioning system defined by claim 1 and further comprised of fluid distribution spine means formed integral with said second tube member outer heat transfer surfaces, said spine means receiving absorption refrigeration fluid from said absorption refrigeration fluid distribution means and from said second tube member outer heat transfer surfaces for vertically downward gravitational flow.

6. The air conditioning system defined by claim 2 and further comprised of fluid distribution spine means formed integral with said second tube member outer heat transfer surfaces, said spine means opposing and radiating outwardly but not contacting said first tube member inner heat transfer surfaces.

7. The air conditioning system defined by claim 3 and further comprised of fluid distribution spine means formed integral with said second tube member outer heat transfer surfaces, said spine means opposing and radiating radially outwardly but not contacting either said helical fluid distribution means or said first tube member inner heat transfer surface.

8. The air conditioning system defined by claim 1 and further comprised of refrigerant vapor header means said refrigerant vapor header means close-coupling said first tube members to said second tube members in vapor circulating relation.

9. The air conditioning system defined by claim 1 and further comprised of interchange valve means cooperating with said absorption refrigeration fluid distribution means and being operable to interchange the flows of liquid refrigerant and concentrated refrigerant solution to said first and second tube members, said interchange valve means being operated when changing the mode of system operation from air cooling to air heating or from air heating to air cooling.

10. The air conditioning system defined by claim 3 wherein said helical fluid distribution means further is comprised of spaced-apart notches, said distribution means notches being spaced apart along and relative to a helical line of contact between said helical fluid distribution means and said first tube member inner heat transfer surfaces.

11. The air conditioning system defined by claim 1 and further comprising an augmentation heat source cooperating with said hydronic fluid loop means, said augmentation heat source comprising atmospheric air exterior to said building interior and having heat available at a temperature greater than the temperature of liquid refrigerant flowed by said absorption refrigeration fluid distribution means to said second tube member outer surfaces, said atmospheric air heating hydronic fluid flowed through said hydronic fluid loop means and liquid refrigerant flowed to said second tube members when said system is operated in the system air heating mode of operation.

12. The air conditioning system defined by claim 1 and further comprising an auxiliary heat source cooperating with said hydronic fluid loop means through by-pass valve means, said auxiliary heat source comprising a reservoir of heat that is transferred to said hydronic loop means by actuation of said by-pass valve means when said system is switched to the system air heating mode of operation to thereby heat liquid refrigerant flowed to said second tube members.

13. The air conditioning system defined by claim 1 and further comprising an augmentation heat source cooperating with said hydronic fluid loop means, said augmentation heat source comprising an auxiliary burner and cooperating coil that are selectively operated to heat hydronic fluid and liquid refrigerant flowed to said second tube members when said system is switched to the system air heating mode of operation.

14. In an absorption refrigeration system having a desorber unit producing refrigerant vapor from a dilute refrigerant solution and a condenser unit producing liquid refrigerant condensed from the refrigerant vapor produced by the desorber unit, in combination;

a. an elongated generally vertical and substantially cylindrical desorber chamber receiving heat desorption of a refrigerant vapor from contained dilute refrigerant solution from a generally annular burner means positioned adjacent the desorber chamber bottom;

b. an elongated generally vertical and substantially cylindrical open tubular baffle member extending concentrically into said desorber chamber from above and cooperatively connecting said desorber chamber to the system condenser unit; and c. inlet means directing dilute refrigerant solution into said desorber chamber in the region of said tubular baffle member;

said inlet means directing dilute refrigerant solution generally tangentially to the desorber chamber vertical cylindrical wall to impart a swirling motion to said solution and effect liquid separation from vapor in the vertical range of said tubular baffle member.

15. The system defined by claim 14 and further comprising a solution preheater coil positioned in surrounding relation to said desorber chamber, said preheater coil being heated by combustion product gases from said burner means and causing heated refrigerant vapor to separate from the dilute refrigerant solution when said solution is directed into said desorber chamber in the region of said tubular baffle member.

16. An absorption refrigeration system producing a dilute refrigerant solution flow from the absorption of refrigerant vapor evaporated from a refrigerant liquid flow into a concentrated refrigerant solution flow, comprising in combination:

a. a high-pressure desorber means receiving one portion of the system dilute refrigerant solution flow for desorption into refrigerant vapor and concentrated refrigerant solution;

b. a high-pressure condenser means condensing said high-pressure desorber means desorber refrigerant vapor into refrigerant liquid;

c. a low-pressure desorber means receiving the remaining portion of the system dilute refrigerant solution flow for desorption into refrigerant vapor and concentrated refrigerant solution;

d. a low-pressure condenser means condensing said low-pressure desorber means desorber refrigerant vapor into refrigerant liquid; and e. absorber and evaporator absorption means receiving said high-pressure desorber and low-pressure desorber concentrated refrigerant solutions in combination and said high-pressure condenser and low-pressure condenser refrigerant liquids in combination for evaporation absorption into said combined high-pressure desorber and low-pressure desorber concentrated refrigerant solutions, said high-pressure desorber refrigerant solution and said low-pressure desorber refrigerant solution having approximately the same solution concentration spans during desorption.

17. The system defined by claim 16 and further comprised of a pair of pump means, said pair of pump means having pumping characteristics which determine the proportioning of the system dilute refrigerant solution flow to said high-pressure desorber means and to said low-pressure desorber means.

18. The absorption system defined by claim 16 wherein one of said pair of pump means is a charging pump means that pressurizes the full flow of dilute refrigerant solution flow received from said absorber and evaporator absorption means to a level sufficient to flow said dilute refrigerant solution flow remaining portion to said low-pressure desorber means, and the other of said pair of pump means is a booster pump means that pressurizes said one portion of the system dilute refrigerant solution flow form the output pressure level of said charging pump means sufficiently to flow said one portion of the system dilute refrigerant solution flow to said high-pressure desorber means.

19. The absorption refrigeration system defined by claim 16 and further comprised of gas-fired burner means flowing heat to said high-pressure desorber means to effect refrigerant desorption and producing combustion product exhaust gases which contain residual heat, a high-pressure heat exchanger means heated by said residual heat, and a low-pressure heat exchanger means heated by said residual heat, said low-pressure heat exchanger means heating said low-pressure desorber means (concentrated refrigerant solution, and said high-pressure heat exchanger means additionally heating said system dilute refrigeration solution flow portion flowed to said high-pressure desorber means.

20. The absorption refrigeration system defined by claim 16 and further comprised of hydronic fluid loop means which cools an included hydronic fluid to flow reject heat to an ambient atmosphere, said hydronic fluid loop means hydronic fluid cooling said low-pressure condenser means to effect condensation of refrigerant vapor into said low-pressure condenser means refrigerant liquid.

21. The absorption refrigeration system defined by claim 19 wherein said low-pressure heat exchanger means additionally heats said dilute refrigerant solution portion flowed to said low-pressure desorber means and wherein said high-pressure heat exchanger means heats said dilute refrigerant solution portion flowed to said high pressure desorber means.

22. The absorption refrigeration system defined by claim 19 and further comprised of a preheater heat exchanger means heated by said residual heat, said preheater heat exchanger means heating said system dilute refrigerant solution portion flowed to said high-pressure desorber means.

23. The absorption refrigeration system defined by claim 21 and further comprised of a pre-heater heat exchanger means heated by said residual heat, said pre-heater heat exchanger means further heating dilute refrigeration solution heated by said high-pressure heat exchanger means.

24. The air conditioning system defined by claim 9 and further comprised of vapor valve means cooperating with said absorption refrigeration fluid distribution means, said fluid distribution means flowing refrigerant vapor for absorption into concentrated refrigerant solution flowed to said second tube member outer heat transfer surfaces in the system air heating mode of operation, and said vapor valve means being operated to an open condition when said interchange valve means is operated to change the mode of system operation from air cooling to air heating.

25. In a double-effect absorption refrigeration system having a cooling mode of operation and a heating mode of operation, in combination, apparatus comprising:

a. a vertically elongated, generally cylindrical, low-pressure desorber chamber means producing refrigerant vapor;

b. a vertically elongated, generally cylindrical, low-pressure condenser chamber means concentrically substantially enveloping said low-pressure desorber chamber means in heat transfer relation, receiving refrigerant vapor at its upper region from said low-pressure desorber chamber means, and having a vapor outlet in its upper extreme; and c. a vertically elongated generally cylindrical jacket means substantially enveloping said low-pressure condenser chamber means and selectively receiving a heat transfer medium, said jacket means receiving recirculated heat transfer medium only during the system cooling mode of operation, and system cooling mode of operation, said low-pressure condenser chamber means producing liquid refrigerant only during the system cooling mode of operation, and said low-pressure condenser chamber means vapor outlet flowing refrigerant vapor only during the system heating mode of operation.

* * * * *